Feb. 17, 1925.
G. F. ZAUN
1,526,622
SECTIONAL FLOOR RACK
Filed July 30, 1923
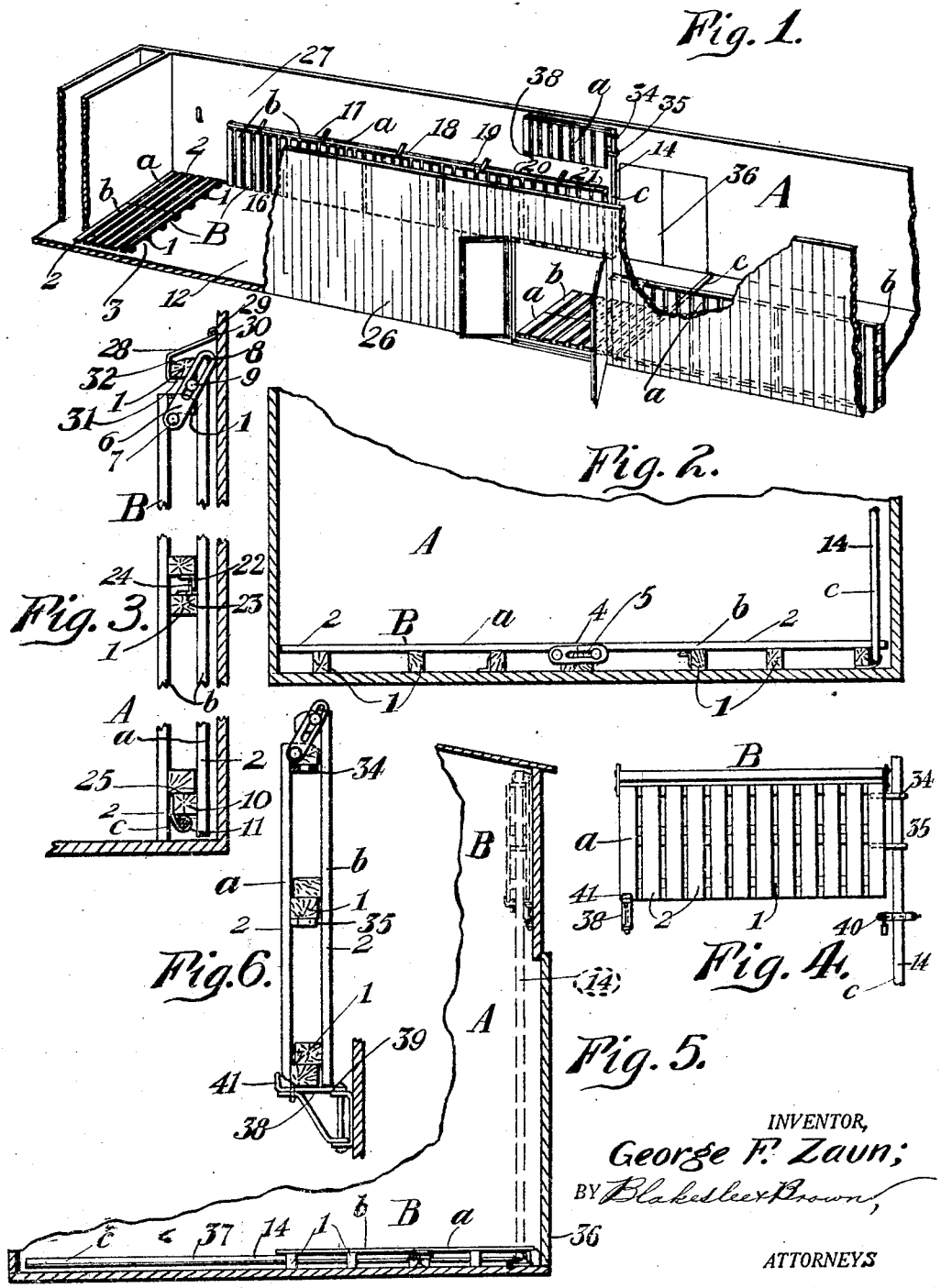

Patented Feb. 17, 1925.

1,526,622

UNITED STATES PATENT OFFICE.

GEORGE F. ZAUN, OF SAN BERNARDINO, CALIFORNIA.

SECTIONAL FLOOR RACK.

Application filed July 30, 1923. Serial No. 654,730.

*To all whom it may concern:*

Be it known that I, GEORGE F. ZAUN, a citizen of the United States, residing at San Bernardino, in the county of San Bernardino and State of California, have invented new and useful Improvements in Sectional Floor Racks, of which the following is a specification.

This invention relates to racks for cars and particularly for box or refrigerator cars adapted to carry perishable commodities such as fruit in which it is necessary to maintain a ventilation throughout the car and upon the floor thereof. Where racks are not a permanent part of a car it often happens that when the car reaches its destination the racks are thrown from the car in order to facilitate unloading of the car, with the result that the racks are badly broken and some times totally unfitted for future use. Where racks are made a permanent fixture within the car they are often so bulky that they take up needless space which might be otherwise utilized for the storing of articles. This is particularly true where the car is used for the storage of articles other than perishable commodities and in which the main floor of the car is used in place of the racks. The racks are often swung to one side of the car and extend out into the car a considerable distance. This makes this particular form of rack objectionable. If the rack is placed near the ceiling of the car it is extremely difficult to lower the same and requires an outlay of considerable money for the installation of such construction.

With the above ideas in view, I have endeavored to provide rack sections which take little or no space within a car when not in use, which are easily handled, do not require any complicated mechanism, are inexpensive to install, provide a smooth working surface when in position of non-use so that articles may be stored against the same, and do not require a modification or variation in the construction of standard box cars now in service.

With the above and other objects in view, the invention consists in the novel and useful provision, formation, construction, association and inter-relation of the various parts, members and features, all as shown in one embodiment in the drawing, described generally, and finally pointed out in claims, In the drawing:

Figure 1 is a fragmentary perspective view of a box car incorporating the invention;

Figure 2 is a fragmentary cross sectional view on an enlarged scale showing rack sections in position upon the floor or the box car of Figure 1, and particularly illustrating the means of connection between such sections;

Figure 3 is a fragmentary vertical sectional view on an enlarged scale and showing the rack folded against a side of the box car of Figure 1 and the method of holding said sections locked in position against such side wall;

Figure 4 is a fragmentary enlarged view of one of the sections for use adjacent the doors of the box car;

Figure 5 is an enlarged fragmentary transverse sectional view of the box car and showing the rack sections for use adjacent the doors of such box car; and, Figure 6 is a fragmentary enlarged end view of the rack sections for use adjacent the door of the box car, said rack sections being held inoperative and against the side wall of the box car.

Corresponding parts in all the figures are designated by the same reference characters.

Referring with particularity to the drawing, the box or refrigerator car is designated by A and the improved racks for said car by B, and said racks are combined and associated in sections as *a* and *b*, which sections *a* and *b* are adapted to be disposed throughout the length of the car, and reference to Figure 1 shows that each section of such racks include stringers or sills 1 upon which slats 2 are laid, said stringers being spaced, and the slats being spacedly mounted upon the stringers to provide openwork construction so that ventilation of air may be assured. The rack sections *a* and *b* in each instance are adapted to cooperate so as to span the car transversely as shown in Figure 1 at 3, and the sections *a* and *b* are hingedly connected adjacent their meeting edges as shown at 4 by means of a hinge 5, which hinge 5 may comprise in the showing an arm 6 pivotally associated as at 7 with one of the sills or stringers 1 of the section *b*, said arm 6 being formed with a longitudinally extended slot 8 through which a pin 9 is passed, said pin 9 being attached to a stringer 1 of the section *a*. Any number of such hinge means may be provided, but in the showing they are provided on the sides of the sections and not intermediate the sides, although it is obvious that they may be so provided if desired. The section *a* has associated with its end stringer 1 shown at 10 a pin-engaging loop or loops 11. Adapted to extend along the floor and specifically at the zone of the angle portion included between the floor 12 and the side wall 13 of the car A, is a long pin *c*, said pin being formed with an angular end 14 adjacent an edge of the door opening 15 of the car, and this end 14 extends approximately the height of the side wall 13 of such car. The pin *c* may be anchored at portions along the car floor to ensure its maintenance in a definite position thereon. If it were desired to fold the rack sections against the side of the car, for instance as shown at 16, 17, 18, 19, 20 and 21, the section *a* might be raised about its hinge connection with the pin *c*, which of course would raise the rack section *b* so that the two rack sections *a* and *b* might "jack-knife" or be folded together, as shown in Figure 3. The particular form of the arm 6 permits the sections *a* and *b* to be interlocked, as the section *b*, due to the movement allowed the pin 9 within the slot 8, permits said section *b* to be raised to a position where angle iron members 22 and 23 carried by stringers of the said sections *a* and *b* may have their legs as shown at 24 interlocked to rigidly hold such sections together, the stringers of such sections cooperating as shown at 25. It thus results that if a rack section such as shown at *a* were to be raised against the side wall 13 of the car without the section *b* cooperating, that the stringers 1 of the same would project outwardly within the car and commodities could not be safely stored against the same. However, by the stringers 1 of the section *b* facing inwardly and abutting against the inner surface of the slats 2 of the section *a*, the slats 2 of the section *b* present an approximately smooth outer surface against which commodities may be stored with safety, and furthermore, the width of projection of both sections outwardly in the car is only slightly greater than the width of the stringer 1 of the rack section *a* so that such folding together or "jack-knifing" of the two sections *a* and *b* does not cause said sections to project into workable space of the car any appreciable amount. If the sections *b* were folded against a side 26 of the car, it is obvious that the width of projection of the combined sections *a* and *b*, assuming the section *a* were folded against the side 13 would be doubled, and therefore the usable space within the car would be lessened. Furthermore, by "jack-knifing" the two sections, the space, as 27 above said sections is left free for use. It is thus to be seen that this particular construction of the sections is saving of space. As a further means for locking said sections in upright position against the side wall of the car, I have provided a retaining medium 28 comprising a bent arm having an end thereof curled as at 29 to retain a pin 30 so that the arm may be swung, with the opposite end as 31 bent to engage one of the stringers 1 of the section *a*. Such stringer is curved as shown at 32 so that the bent end 31 of the arm 28 may slide thereover and automatically lock the section *a*, and, of course the section *b*, against the side wall of the car. The sections *a* and *b* on one side of the car, that is, the space included between one side of the door and an end of the car, may be folded out of position against the side 13 of such car, while sections on the opposite side of the door and included between such door and the opposite end of the car may be folded against the wall 26, as shown at 33.

Heretofore it has been customary to arrange complicated mechanism of some form to take care of the racks adapted for placement in front of or between the doors of the car, and the present invention overcomes complicated mechanism of any form. As before, rack sections *a* and *b* are provided, and the section *a* is provided at one end with engaging loops or eyes 34 and 35 for engaging the end 14 of the pin *c*. The section *a* of any of the racks is the locked or hinged section, and the section *b* the movable section. The sections *a* and *b*, referring to Figure 5, are first shown as in an extended position, that is, lying upon the floor and in front of one of the doors, say the door 36. The sections *a* and *b* in the showing when extended as shown in Figure 5 do not necessarily span the width of the car between the doors, although they might do so. However, in the door I have shown said sections as only spanning half the width of the floor of the car when cooperating in extended position. When the said sections *a* and *b* are lying upon the floor as shown in Figure 5, the arm 14 parallels the slats of the rack sections *a* and *b*, as shown at 37, and it is obvious that said sections *a* and *b* may be slid along said arm 14 to any desired position between the doors on the car floor. If it were desired to remove the sections *a* and *b* from between the doors, the sections might be "jack-knifed" or folded together, as before, then the pin end 14 might be revolved so as to parallel the side wall 13 of the car, the sections *a* and *b* pushed upwardly, the said section *a* permitting such movement by the members 34 and 35 sliding along the pin end 14 to where the sections might have a zone adjacent, their ends, as shown at 38 slipped over a bracket member 39 carried on the wall 13, and above the other rack sections such as those shown folded at 20 and 21. A hasp or other retaining means 40 may be then passed over the end 14 so as to lock such end against the side 13 of the car. If it were desired to lower said sections for use between the door opening, the hasp 40 would be released, the sections pushed upwardly slightly so that the end zone 38 would disengage the curved end 41 of the bracket 39, whereupon said sections might be lowered, the loops 34 and 35 sliding along the end 14, the rack sections then revolved so as to be in position in front of the door opening 36, whereupon it will be observed that the section $b$ may be opened from the section $a$ and the slats presented so as to provide a surface upon which work may be placed. In this construction it will be seen that the section $a$ faces outwardly, while in the other rack sections $a$ and $b$, as shown at 16 to 21 inclusive, the rack section $a$ faces inwardly against the wall 13. However, upon revolution or turning of the sections for placement between the door openings, the relative positions will be the same as before.

In loading the car the movable sections between the door openings may be left in non-use, that is, locked against the side wall 13, or as the construction is identical for the side wall 26, locked in position against such wall, and the sections shown at 16, 17 and 18 may be placed upon the floor 12 as they are desired for use. It will thus follow that a clear trucking surface is provided within a car up to the point of using the racks and storing and placing work thereon. When the last rack sections have been used one of the sections for the door opening may be lowered and it may be slid to various positions along the arms 14, the other door, as desired, permitting a trucking of commodities therethrough for placement on the rack, whereupon the other door section may be lowered and work than placed thereon.

It is obvious that various changes and modifications may be made in practicing the invention in departure from the particular showing of the drawing, without departing from the true spirit of the invention.

Having thus disclosed my invention, I claim and desire to secure by Letters Patent:

1. The combination with a car having the usual side walls and floor and door openings in the side walls, of rack sections for placement between such door openings, and means for maintaining such rack sections in position of service between such door openings; such sections being formed in cooperating pairs, and such means comprising a member adapted to hold such sections in an upright position against a side wall of the car or to be revolved to a position that such sections may rest upon the floor of the car and between such door openings.

2. The combination with a car having the usual side walls and floor member, of a pin member having a leg thereof extended along the floor and adjacent a wall of the car, with a second leg of the pin bent at right angles to the first leg thereof, and rack members hingedly carried by each leg of the pin.

3. The combination with a car having the usual side walls and floor member, of a pin member having a leg thereof extended along the floor and adjacent a wall of the car, with a second leg of the pin bent at right angles to the first leg thereof, and rack members hingedly carried by each leg of the pin; such rack members being formed in pairs, certain of which are adapted to transversely span the car floor.

4. The combination with a car having the usual side walls and floor member, of a pin member having a leg thereof extended along the floor and adjacent a wall of the car, with a second leg of the pin bent at right angles to the first leg thereof, and rack members hingedly carried by each leg of the pin; such rack members being formed in pairs, certain of which are adapted to transversely span the car floor; one of such rack members being hingedly associated with the pin and a second rack member being hingedly associated with the first rack member.

5. The combination with a car having the usual side walls and floor member, of a pin member having a leg thereof extended along the floor and adjacent a wall of the car, with a second leg of the pin bent at right angles to the first leg thereof, and rack members hingedly carried by each leg of the pin; such rack members being formed in pairs, certain of which are adapted to transversely span the car floor; one of such rack members being hingedly associated with the pin and a second rack member being hingedly associated with the first rack member; there being means for locking such first and second rack members together.

6. The combination with a car having the usual side walls and floor member, of a pin member having a leg thereof extended along the floor and adjacent a wall of the car, with a second leg of the pin bent at right angles to the first leg thereof, and rack members hingedly carried by each leg of the pin; such rack members being formed in pairs, certain of which are adapted to transversely span the car floor; one of such rack members being hingedly associated with the pin and a second rack member being hingedly associated with the first rack member; there being means for locking such first and second rack members together; each rack member including spaced stringers and spaced slats mounted upon a surface of such stringers.

7. The combination with a car having the usual side walls and floor member, of a pin member having a leg thereof extending along the floor and adjacent a wall of the car, with a second leg of the pin bent at right angles to the first leg thereof; and rack members hingedly carried by each leg of the pin; such rack members being formed in pairs, certain of which are adapted to transversely span the car floor; one of such rack members being hingedly associated with the pin and a second rack member being hingedly associated with the first rack member; there being means for locking such first and second rack members together; each rack member including spaced stringers and spaced slats mounted upon a surface of such stringers; the said stringers, when the rack members are folded, cooperating to lock the rack members together.

8. In a device of the character disclosed, two rack sections, each section including spaced stringer members, and slat members spacedly mounted upon a surface of such stringer members, hinge means connecting an end of each section in such a manner that the said sections may be folded together so that the slats are on the outside, and means for locking the sections together when in such position.

9. In a device of the character disclosed, two rack sections, each section including spaced stringer members, and slat members spacedly mounted upon a surface of such stringer members, hinge means connecting an end of each section in such a manner that the said sections may be folded together so that the slats are on the outside, and means for locking the sections together when in such position; such means being carried by the stringers.

10. In a device of the character disclosed, two rack sections, each section including spaced stringer members, and slat members spacedly mounted upon a surface of such stringer members, hinge means connecting an end of each section in such a manner that the said sections may be folded together so that the slats are on the outside, and means for locking the sections together when in such position; such hinge means being formed to provide relative adjustment between the sections.

In testimony whereof, I have signed my name to this specification in the presence of two subscribing witnesses.

GEORGE F. ZAUN.

Witnesses:
HENRY O. HADDIES,
H. C. HOWLAND.